United States Patent [19]

Ferris et al.

[11] Patent Number: 4,645,423
[45] Date of Patent: Feb. 24, 1987

[54] TENSION/COMPRESSION ROD ARRANGEMENT FOR DAMPING HELICOPTER ROTOR BLADE OSCILLATIONS

[75] Inventors: Donald L. Ferris, Newton; David G. Matuska, Stratford, both of Conn.

[73] Assignee: United Technologies Corporation, Hartford, Conn.

[21] Appl. No.: 760,232

[22] Filed: Jul. 29, 1985

[51] Int. Cl.[4] .............................................. F03D 7/04
[52] U.S. Cl. ................................ 416/140; 416/134 A
[58] Field of Search ............... 416/134 A, 140 A, 141, 416/148, 106, 107

[56] References Cited

U.S. PATENT DOCUMENTS

| 2,620,888 | 12/1952 | Avery | 416/140 A |
| 3,262,407 | 7/1966 | Culver et al. | 416/140 A |
| 3,310,119 | 3/1967 | Watson | 416/141 |
| 4,378,198 | 3/1983 | Petterson | 416/140 |
| 4,419,051 | 12/1983 | De Rosa | 416/134 A |
| 4,452,569 | 6/1984 | Stephan et al. | 416/134 A |

FOREIGN PATENT DOCUMENTS

| 623361 | 12/1935 | Fed. Rep. of Germany | 416/140 |
| 3148903 | 6/1983 | Fed. Rep. of Germany | 416/140 A |
| 3146347 | 6/1983 | Fed. Rep. of Germany | 416/141 |
| 1442684 | 5/1966 | France | 416/140 A |
| 2500076 | 8/1982 | France | 416/140 |

Primary Examiner—Robert E. Garrett
Assistant Examiner—John Kwon
Attorney, Agent, or Firm—E. Richard Skula; A. Dean Olson

[57] ABSTRACT

Apparatus for damping blade lead/lag motion on a hingeless helicopter rotor assembly, including a hub, blades and flexbeam(s) interposed between the root end of the blades and the hub. Rigid, radial links extend the length of the flexbeams for attachment to the outboard ends thereof. Lead/lag motion at the outboard end of the flexbeam causes flexbeam bending, which is converted to radial translation of the links. This radial translation of the links and likewise the blade lead/lag motion is damped by damper means connected between the inboard ends of the links and the hub.

7 Claims, 4 Drawing Figures

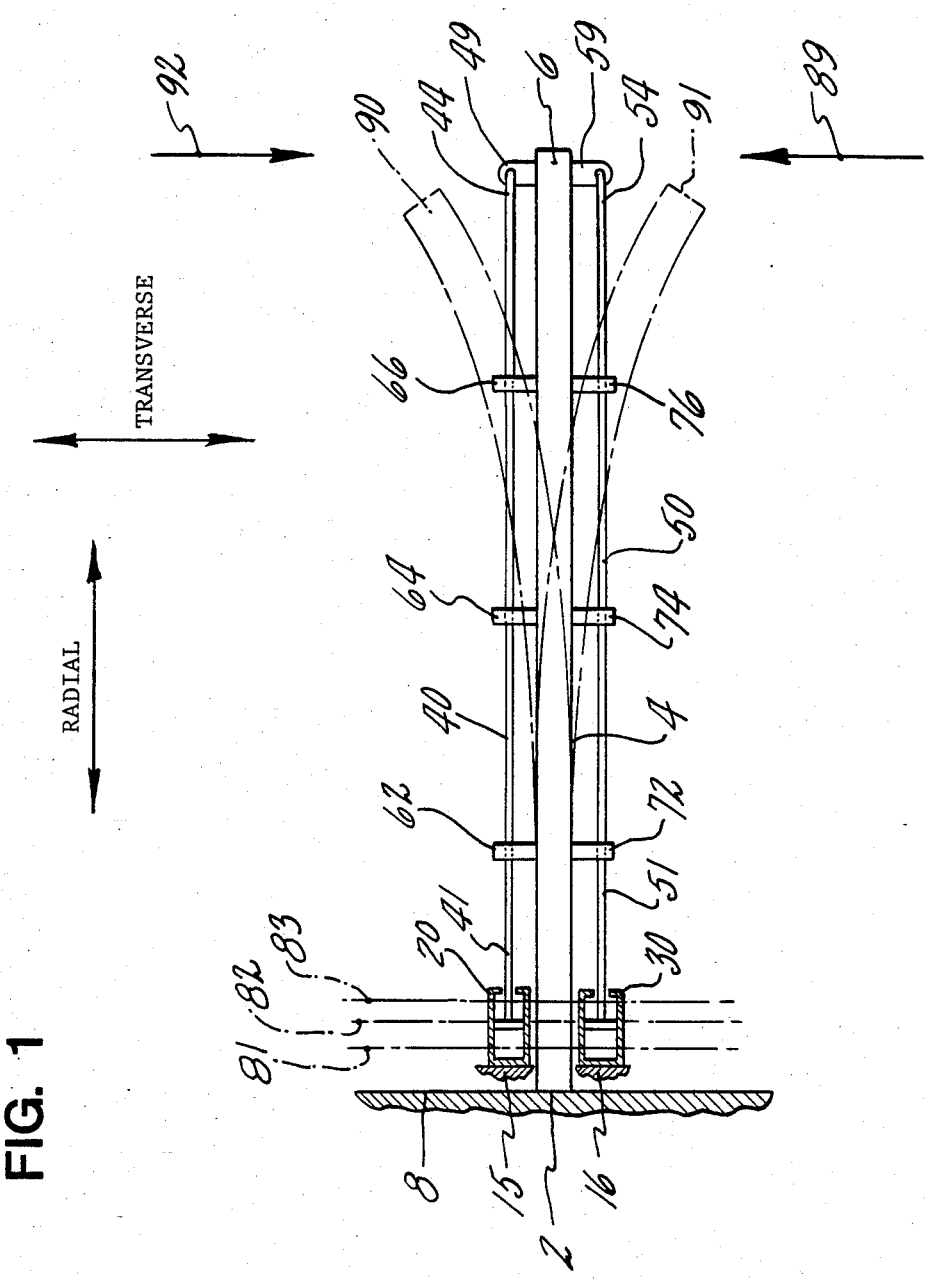

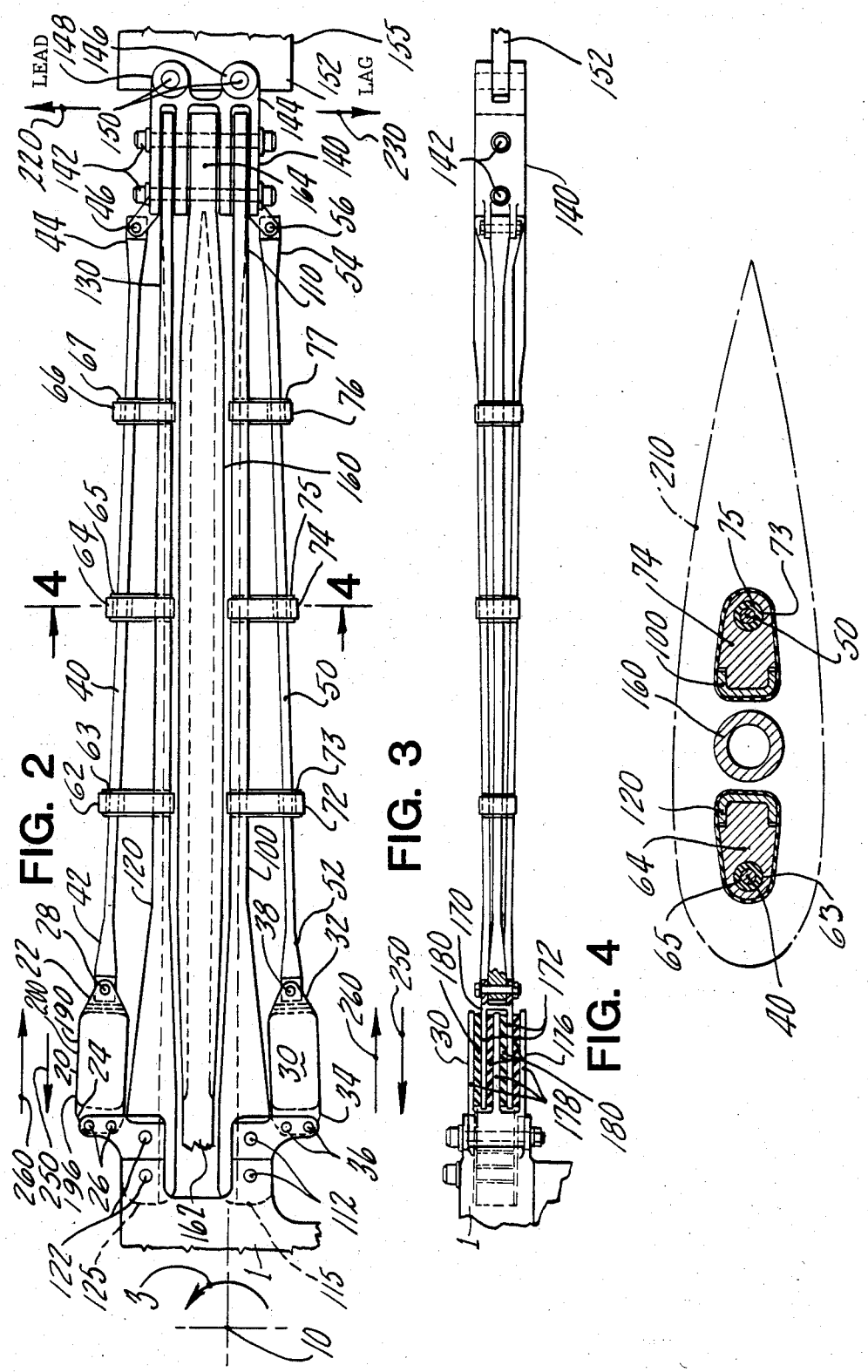

4,645,423

TENSION/COMPRESSION ROD ARRANGEMENT FOR DAMPING HELICOPTER ROTOR BLADE OSCILLATIONS

The Government has rights to this invention pursuant to Contract No. DAAK51-83-C-0010 awarded by the Department of the U.S. Army.

TECHNICAL FIELD

The invention relates to helicopter rotor assemblies, more specifically damping mechanisms for blade lead/lag motion.

BACKGROUND ART

Hinges on a conventional, articulated helicopter rotor hub permit flapping motion of the blades, pitching movement of the blades, and lead/lag movement of the blades, but add to the overall mass and weight of the helicopter hub. In addition, the hinges require lubrication and constant observation to detect wear and fatigue.

Hingeless helicopter rotor assemblies using composite materials, are being developed in response to the aforementioned limitations to provide light weight helicopter hub assemblies. A hingeless helicopter rotor assembly typically includes a rigid central hub member and radial flexible beams (flexbeams) rigidly attached by their root (inboard) ends thereto. The blades are rigidly attached at their root ends to the outboard ends of the flexbeams. A flexbeam may comprise at least one C-beam, I-beam, T-beam, X-beam, etc.

One flexbeam embodiment comprises two back-to-back C-beam members. The flexbeam is designed to bend in the vertical mode to accommodate blade flapping and in the horizontal mode to accommodate lead/lag motion of the blades. A rigid pitch shaft disposed between the two C-beam members transmits blade pitch-changing inputs from a control rod near the hub to the root end of the blade, and the flexbeams yield torsionally to permit the blade pitch changes. Thus, flexbeams must be resilient in three orthogonal axes (pitch, lead/lag and flap), but of course are longitudinally rigid to transmit blade centrifugal force to the central hub. Such an arrangement is the Sikorsky Elastic Gimbal Rotor which is disclosed in greater detail in Paper No. A-84-40-17-8000 presented at the 40th Annual Forum of the American Helicopter Society on May 16–18, 1984. This hingeless helicopter rotor with elastic gimbal hub is illustrated in U.S. Pat. No. 4,323,332.

The rotating blades in a helicopter hub assembly are known to go through a variety of predictable cyclic position changes due to external vibratory forces. For example, alternating position due to one per revolution air forces with forward flight as well as coriolis forces as a result of dynamic coupling of flapping and lead/lag motion act on each rotor blade throughout a revolution. Other possible vibratory forces include those associated with the rotor shaft motion when the helicopter is sitting on the ground and naturally rocking on its landing gear.

If a condition is encountered such that any single rotor mode (i.e., flap, lead/lag, pitch) is forced to vibrate at a frequency close to the natural frequency of that mode, resonance will take place with potentially catastrophic results. Without proper damping the amplitude of the oscillations could increase to destructive magnitudes. This is especially a problem for the lead/lag mode as both the flapping mode and the pitch mode are inherently adequately damped. Flapping motion is naturally damped by aero-dynamic forces and pitch motion is naturally damped through the control system. Lead/lag motion, however, has little or no natural damping.

It is known to include mechanical vibration dampers in conventional helicopter rotor assemblies to provide mechanical damping for the lead/lag mode and thereby avoid the potential problems should external vibratory forces approach the lead/lag mode natural frequency. This is typically done by connecting hydraulic damping cylinders from the blade to the hub assembly.

In a hingeless helicopter hub assembly using flexbeams, as discussed above, it is not practical to attach a damping device directly between the hub and the blade because of the intervening flexbeam, which may be as long as 20% of the blade length. In addition, the amplitude of the lead/lag motion of a helicopter blade in a hingeless rotor assembly tends to be less than the amplitude in an articulated rotor system. Accordingly, the movement of the flexbeam is substantially less than that of the blade in the horizontal position since the amount of displacement is a function of radial (longitudinal) distance from the root end of the flexbeam. Although it would be possible to use a hydraulic damping means to damp the flexbeam lead/lag motion, conventional hydraulic dampers have the disadvantages of requiring high maintainance, having relatively low efficiencies, and being relatively large and heavy.

DISCLOSURE OF INVENTION

Therefore, it is an object of this invention to provide efficient light weight damping of a flexbeam and the blade attached thereto.

An apparatus for damping blade lead/lag motion in a helicopter rotor system having a centrol hub, radial flexbeams attached at their root ends thereto and blades attached at their root ends to the outboard ends of the flexbeams is disclosed. The apparatus comprises at least one rigid link radially (longitudinally) extending the length of each flexbeam and offset in the plane of lead/lag motion therefrom, said link having an inboard end and an outboard end. A first attachment means attaches the outboard end of said link to the outboard end of the flexbeam. A damping means having an inboard end and an outboard end is connected between the central hub and the inboard end of said link. A second attachment means pivotally attaches the inboard end of said link to the outboard end of the damping means. Bending of the flexbeam caused by lead/lag movement of the blade will result in radial translation of said link causing the damping means to react and damp out the radial translational movement of the link to permit radial motion of the links in response to lead/lag bending of the flexbeam, each link is optionally provided with a bushing means at each end.

Optionally, at least one standoff member per damper link is connected to the flexbeam to maintain the offset so that the damper link bends in conformity to the flexbeam. In addition to ensuring that offset is maintained, the standoff members permit the use of softer light weight links thereby reducing the overall weight of the structure.

Other features and advantages of the invention will become more apparent from the following description and accompanying drawings.

BRIEF DESCRIPTION OF THE DRAWINGS

FIG. 1 is a free-body diagram illustrating the principle of operation for the damper apparatus of the present invention.

FIG. 2 is a plan view of a preferred embodiment of the damper apparatus of the present invention.

FIG. 3 is a detailed side view of the damper apparatus.

FIG. 4 is a cross-sectional view of a flexbeam utilizing the damper apparatus of the present invention.

BEST MODE FOR CARRYING OUT THE INVENTION

FIG. 1 shows a free-body diagram illustrating the principle of operation for the damper mechanism of the present invention. A flexible beam 4 is fixed at its root end 2 (inboard) to a surface 8 and is free at its other end 6 (outboard). Motion in the plane of the page will be considered. A radial link 40 (leading) extends substantially the length of the beam 4 and is offset on one side therefrom in the plane of motion, said link 40 being parallel to the beam 4. The leading link 40 is pivotally joined on its outboard end 44 to the beam 4 by an articulable joint 49 to permit motion in the plane. The link 40 is pinned at its inboard end 41 to dashpot 20. The dashpot 20 is fixed at its inboard end to the surface 15, while its outboard end is free to displace in the radial direction and is shown in the resting position 82.

A radial link 50 (trailing) is similarly offset in the plane of motion on the other side of the beam 4. The trailing radial link 50 is pinned on its outboard end 54 to articulable connector 59. The link 50 is pinned at its inboard end 51 to dashpot 30. The dashpot 30 is fixed at the inboard end to the surface 16, while its outboard end is free to displace in the radial direction and is shown in the resting position 82.

A transverse force, as indicated by an arrow 89 acting on the free end 6 of the beam 4 will cause it to bend to the position shown by the dashed line 90.

In this displaced condition, the longitudinal link 40 is placed in compression and the outboard end of the dashpot 20 is displaced radially inward to the position 81. At the same time the link 50 is placed in tension and the outboard end of the dashpot 30 is displaced radially outward to position 83. This displaced condition of the beam 4 to the position 90 is the equivalent of the leading position of a helicopter blade in reference to a rotor hub.

A transverse force, as indicated by an arrow 92, acting on the free end 6 of the beam 4 will cause it to bend to the position shown by the dashed line 91. In this displaced condition, the link 40 is placed in tension and the outboard end of the dashpot 20 is displaced radially outward to position 83. At the same time, the link 50 is placed in compression and the outboard end of the dashpot 30 is displaced radially inward to position 81. This displaced condition of the beam 4 to the position 91 corresponds to the lagging position of a helicopter blade with respect to a central hub member. The movement of beam 4 to positions 90 and 91 represents lead/lag motion of a typical helicopter blade and the flexbeam assembly, and this is the lead/lag plane of motion of such a blade represented by the radial and transverse vectors.

It will be appreciated from FIG. 1 that the radial motions of the links 40 and 50 in response to the beam 4 bending is a function of how near the neutral axis of the outboard end 6 of the beam 4 they are joined thereto. In a general sense, in the application described hereinafter, the nearer the links 40 and 50 are joined to the neutral axis of the end 6 of the beam, the better, since the invention relies on reacting movements at the outboard end 6 of the beam with the dampers 20 and 30 located at its inboard end 2 through damper rods 40 and 50.

FIG. 2 shows a plan view of a preferred embodiment of the damper apparatus of the present invention. A rotor hub 1 rotates in a direction indicated by an arrow 3 about a shaft central axis 10. A trailing C-shaped flexbeam 100 is firmly attached at its root end 115 by suitable means 112 to rotor hub 1. A leading C-shaped flexbeam 120 is firmly attached at its root end 125 by suitable means 122 to the rotor hub 1. The outboard end 110 of flexbeam 100 is firmly attached to an outboard fitting 140 by suitable means 142. The outboard end 130 of flexbeam 120 is connected to the outboard fitting 140 by suitable means 142. A root end 152 of a blade 155 is connected to an outboard end 144 of the outboard fitting 148 at lugs 146 and 148 by a suitable means 150. The damper assembly 30 is firmly attached at its root (inboard) end 34 to the hub 1 by a suitable means 36 such that the damper assembly 30 is offset in the plane of lead/lag motion from the flexbeam 100. The outboard end 32 of the damper assembly 30 is connected to a root end 52 of the damper link 50 by a suitable means 38. The damper link 50 is offset in the plane of lead/lag motion from flexbeam 100 by standoff members 72, 74, and 76. The damper link 50 is attached at an outboard end 54 to the outboard fitting 140 by a suitable means 56. The damper assembly 20 is firmly attached at its root end 24 to hub 1 by a suitable means 26 such that the damper assembly 20 is offset in the plane of lead/lag motion from the flexbeam 120. An outboard end 22 of the damper assembly 20 is attached to a root end 42 of the damper link 40 by a suitable means 28. The damper link 40 is offset in the plane of lead/lag motion from the flexbeam 120 by the standoff members 62, 64 and 66. An outboard end 44 of the damper link 40 is attached to outboard fitting 140 by suitable means 46.

A torque pitch tube 160 is centered between the leading flexbeam 120 and the trailing flexbeam 100. The torque pitch tube 160 is firmly attached at its outboard end 164 to the outboard fitting 140 by suitable means 142. The torque pitch tube 160 is firmly attached at its root end 162 to a pitch control linkage means (not shown) so that a torsional force applied to torque pitch tube 160 at its root end 162 is communicated to blade 155 through the outboard fitting 140.

The particulars of the trailing damper assembly 30 are better viewed as illustrated in side view in FIG. 3. Damper assembly 30 comprises outboard damper housing 170 and inboard damper housing 176 and elastomeric damper layers 180. The inboard damper housing 176 has at least one member 178 and the outboard damper housing 170 has at least one member 172, said members are interleaved and separated by at least one elastomeric damper layer 180. The elastomeric damper layers 180 are typically flat rectangular layers bonded on one side to the inboard members 178 and on the other side to the outboard members 172. The leading damper assembly 20 will similarly comprise an outboard damper housing 190 having at least one member 192, an inboard damper housing 196 having at least one member 198, and at least one elastomeric damper layer 200.

Movement of the outboard damper housing 170 relative to the inboard damper housing 176 will cause the elastomeric damper layers 180 to deform in the shear mode thereby damping out the translatory input to the damper assembly 30. The damper assembly 20 will function in a similar manner. It will be appreciated by one skilled in the art that the essentially planar elastomeric damper assemblies heretofore described can be replaced by equivalent elastomeric dampers having different configurations including cylindrical. It will similarly be appreciated that the dampers 20 and 30 can be mounted so that the elastomeric layers 180 are perpendicular to the plane of lead/lag motion.

FIG. 4 is a cross-sectional view 4—4 through the flexbeam assembly of FIG. 2. The torque pitch tube 160 is centrally located between the flexbeam 100 and flexbeam 120, both of which are transversely offset therefrom in the plane of lead/lag motion. The standoff member 74 and the standoff member 64 are seen attached to the flexbeam 100 and the flexbeam 120, respectively. Standoff members 74 and 64 contain holes 73 and 63 respectively therethrough for receiving damper links 50 and 40 which pass therethrough. Elastomeric rings 75 and 65 fit within the offset holes 73 and 63 and are in friction fit with or bonded to the links 50 and 40. The rings 75 and 65 are attached by suitable means to the standoff members 74 and 64. The flexbeam assembly is optionally housed by a fairing member 210 extending radially over the length of the flexbeam assembly functioning as an aerodynamic protective shroud.

A leading motion of the blade 155 in the lead/lag plane in a direction indicated by an arrow 220 to position 90 of FIG. 1 will cause the link 40 to be placed in compression and link 50 to be placed in tension. This will cause the root end 42 of the link 40 to move radially inward in the direction indicated by arrow 250. This movement will cause the outboard damper housing 190 of the damper assembly 20 to displace in direction 250 relative to inboard damper housing 196 to position 81 of FIG. 1 placing elastomeric damper layers 200 into a shear mode thereby damping out the movement of the damper link 40 in the direction indicated by the arrow 250. At the same time link 50 will be placed in tension causing the root end 52 of the link 50 to displace in a radial direction indicated by the arrow 260. This causes the outboard damper housing 170 of the damper assembly 30 to move longitudinally outward in the direction indicated by arrow 260 relative to the inboard damper housing 176 to the position 83 of FIG. 1. This places elastomeric damper layers 180 in a shear mode, damping out the movement of the damper link 50 in the direction indicated by the arrow 260. This results in the damping of the leading motion of the blade 155 as indicated by the arrow 220.

A movement of the blade 155 in a lagging direction in the lead/lag plane indicated by an arrow 230 to the position 91 of FIG. 1 causes link 40 to be placed in tension and link 50 to be placed in compression. Link 40 is displaced radially outward in the direction indicated by the arrow 260 thereby causing outboard damper housing 190 of the damper assembly 20 to be displaced radially outward in the direction indicated by the arrow 260 relative to inboard damper housing 196 to the position 83 of Fig. 1. This causes elastomeric layers 200 to be placed in a shear mode thereby damping out the radial motion of link 40. At the same time, the root end 52 of the damper link 50 is displaced radially inward in the direction indicated by the arrow 250 thereby causing outboard damper housing 170 of the damper assembly 30 to displace radially inward in the direction indicated by the arrow 250 to the position 81 of FIG. 1. This causes elastomeric damper layers 180 to be placed in a shear mode thereby resisting the motion of link 50 and damping out this radial motion. This results in the damping of the lagging motion of the blade 155 as indicated by the arrow 230.

Radial motion of links 50 and 40 causes the elastomeric rings 75 and 65 contained in standoff spacers 74 and 64 to similarly resist and damp the radial motion of the damper links by shearing movement of the elastomer. The elastomeric rings 63, 67, 73 and 77 contained in the standoff members 62, 66, 72, and 76 will function in a similar manner.

Due to the small radial movement of damper links 50 and 40 in directions indicated by the arrow 250 and the arrow 260 as a result of lead/lag motion of the blade 155 in the directions indicated by the arrow 220 and the arrow 230, the vibratory movement which will be seen by the damper assemblies 30 and 20 will be in the order of ±0.020 inches. Elastomeric damper assemblies are preferred in the practice of this invention since they are capable of damping out high force, small displacement movements while having an overall small structural size and corresponding light weight. In addition, elastomeric damper assemblies are virtually maintenance free. Although elastomeric dampers are primarily unidirectional, the construction of the dampers permits slight damping of forces in directions offset from the primary direction. For example, the dampers of the present invention primarily damp out longitudinal movement but are also effective (to a lesser degree) in damping out transverse components. It is contemplated that equivalent damping means may be used in the practice of the present invention if the equivalent damping means are small and light weight.

Damper links 40 and 50 may be any rigid rods, beams, or members having any structural shape, by rigid is meant the capacity to sustain compressive and tensile forces without buckling or deforming. Elastomeric damper layers 180 and 200 as well as elastomeric standoff damper rings 63, 65, 67, 73, 75, and 77 may be constructed of any elastomeric compound known in the art which is capable of damping the forces present in a typical helicopter blade lead/lag movement in the directions indicated by the arrow 220 and the arrow 230, for example, natural rubber.

The standoff members 62, 64, 66, 72, 74, and 76 are optional in the practice of the invention, but are preferred. The use of the standoff members optimizes the conversion of the lead/lag motion of the blades and the corresponding bending of the flexbeams to a motion of the damper links which is predominantly translational in the radial direction as demonstrated in FIG. 1. Although the damping links and the standoff members of the present invention may be constructed of any material conventional in the art, it is preferred to construct these members of composite materials, etc., such as graphite fiber, polyaramide fiber, and glass fiber reinforced epoxy matrices.

Although this invention has been shown and described with respect to detailed embodiments thereof, it will be understood by those skilled in the art that various changes in form and detail thereof may be made without departing from the spirit and scope of the claimed invention.

We claim:

1. Apparatus for damping blade lead/lag motion in a helicopter rotor system having a central hub (1), radial flexbeams (100,120) attached at their root ends (115,125) thereto, and blades (155) attached at their root ends (152) to the outboard ends (110,130) of the flexbeams, comprising:

at least one rigid link (50) radially extending the length of each flexbeam (100) and offset in the plane of lead/lag motion therefrom, said link (50) having an inboard end (52) and an outboard end (54);

a first attachment means for attaching the outboard end (54) of said link (50) to the outboard end (130) of the flexbeam;

a damping means (30) having an inboard end (34) and an outboard end (32) connected between the central hub (1) and the inboard end (52) of the link (50); and a second attachment means for pivotally attaching the inboard end (52) of the link (50) to the outboard end (32) of the damping means, wherein bending of the flexbeam (100) caused by lead/lag movement of blade (155) will result in radial translation of the link (50) causing the damping means to react and damp out the radial translational movement of the link.

2. The apparatus of claim 1 further comprising:

at least one standoff member (74), mounted between the flexbeam (100) and the link (50) and maintaining the offset between the link and the flexbeam; and a means for mounting the standoff member (74) to the flexbeam (100) so that the link (50) will bend in approximate conformance to the lead/lag bending of the flexbeam resulting in greater coupling of lead/lag bending motion to radial translational motion of the link (50).

3. The apparatus of claim 2 wherein the standoff member (74) further comprises a hole (73) contained therein and, an elastomeric ring (75) mounted in the hole (73), the inner surface of the elastomeric ring being mounted to the outer surface of the link (50), so that radial movement of the link (50) will cause the elastomeric ring (75) to be placed in shear by displacing the inner surface of the ring in the radial direction relative to the standoff member (74), thereby damping the radial translation of the link (50).

4. The apparatus of claim 2 comprising three standoff members per link equally spaced along the length of said flexbeam.

5. The apparatus of claim 1 comprising a first link (40) and a first damping means (20) attached between the rotor hub (1) and a first flexbeam (120) offset in the plane of lead/lag motion on a leading side of the flexbeam (120) and a second link (50) and a second damping means (30) attached between the rotor hub (1) and a second flexbeam (100) offset in the plane of lead/lag motion on a trailing side of the flexbeam (100).

6. The apparatus of claim 1 wherein the means for attaching the outboard end (54) of the link (50) to the flexbeam (100) comprises a pivotable attachment means to permit an angular offset between the link (50) and the flexbeam when the flexbeam (100) bends in reaction to lead/lag motion of blade (155).

7. The apparatus of claim 1 wherein the means for attaching the inboard end (52) of link (50) to the damper assembly (30) comprises a pivotable attachment means to permit an angular offset between the link (50) and the flexbeam (100) when the flexbeam (100) bends in reaction to lead/lag motion of blade (155).

* * * * *